No. 827,005. PATENTED JULY 24, 1906.
L. A. GARDNER.
CREEPER FOR ANIMALS.
APPLICATION FILED SEPT. 11, 1905.
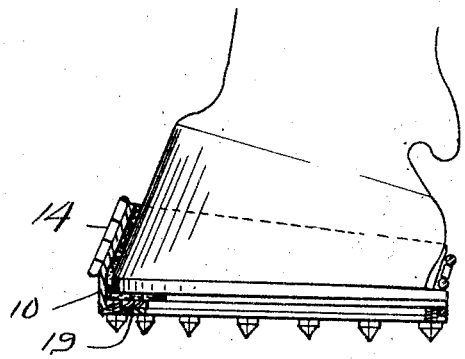
Fig. 2.
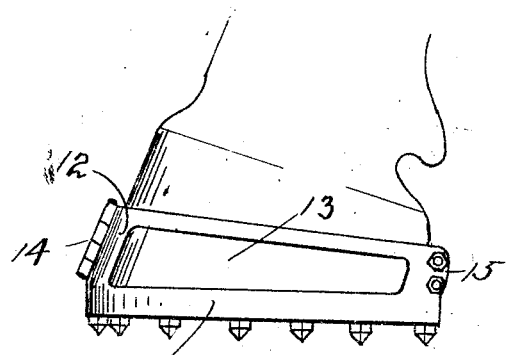
Fig. 1.
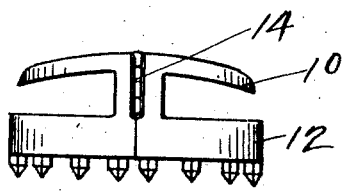
Fig. 3.
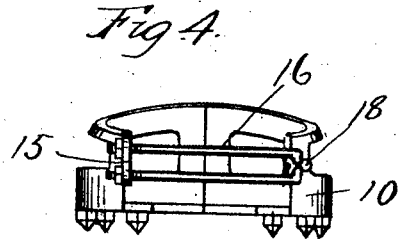
Fig. 4.
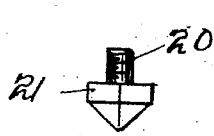
Fig. 7.
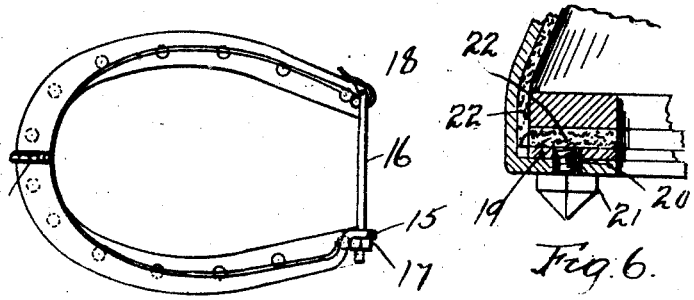
Fig. 5.
Fig. 6.
Witnesses
E. S. Ogden
A. L. Makepeace
Inventor
Louis A Gardner
By Howard E Barlow
Attorney

UNITED STATES PATENT OFFICE.

LOUIS A. GARDNER, OF PROVIDENCE, RHODE ISLAND, ASSIGNOR TO TIMOTHY E. HOPKINS, OF KILLINGLY, CONNECTICUT.

CREEPER FOR ANIMALS.

No. 827,005.　　　　Specification of Letters Patent.　　　Patented July 24, 1906.

Application filed September 11, 1905. Serial No. 277,869.

*To all whom it may concern:*

Be it known that I, LOUIS A. GARDNER, a citizen of the United States, residing at the city of Providence, in the county of Providence and State of Rhode Island, have invented certain new and useful Improvements in Creepers for Animals, of which the following is a specification, reference being had therein to the accompanying drawings.

This invention relates to creepers designed to be attached to the hoofs of horses or other animals and worn in icy or slippery places; and the object of the invention is to provide a creeper that is simple and practical in construction, light in weight, and that may be easily and quickly attached and detached to and from the hoof.

A further object of my invention is to so construct the frame of my creeper that it may be attached to a hoof that is not shod and that it will serve the purpose of shoes when so attached.

A further object is to provide spurs that may be readily removed from the frame portion of the creeper, so that each one may be easily sharpened and replaced.

The invention is fully set forth in this specification and more particularly pointed out in the appended claims.

In the accompanying drawings, Figure 1 illustrates my creeper as applied to a horse's hoof. Fig. 2 is a sectional elevation of the creeper in position on a horse's hoof. Fig. 3 is a front elevation of the creeper, showing the hinge. Fig. 4 is a rear elevation of the creeper, showing the adjustable means of attaching the same to the hoof. Fig. 5 is a plan view of my improved creeper. Fig. 6 is an enlarged sectional view illustrating the construction of the creeper and the application of one of the spurs. Fig. 7 is a detail of one of the spurs.

Referring to the drawings, at 10 is the frame of the creeper constructed to take the general shape of a horse's hoof. This frame is turned under at its bottom portion at 11 about the width of the ordinary shoe. The frame then extends up the side of the hoof for a short distance all around the same, as shown in 12 in Fig. 1. I preferably construct this framework of thin metal and cut out its sides, as at 13, (see Fig. 1,) to reduce the weight of the same. This frame portion is preferably constructed in two parts hinged together at 14 at its front or forward end. At the rear of the frame and extending from one side thereof is the ear 15, and projecting through this ear are the two threaded ends of the adjustable U-shaped strap 16, the working length of which strap may be adjusted and regulated by the turning of the nuts 17. On the corresponding end at the opposite side of the frame is preferably used a hinged tongue or clasp 18, adapted to hook into the connected end of the strap 16, which hook serves the purpose of drawing the two halves of the frame together and securely locking them in that position on the animal's foot. In order to stiffen the bottom portion of the framework, I have provided a reinforcing-strip 19, that is made in halves to follow the shape of the bottom of the frame and admit of being separated at its forward end when the frame opens on its joint to receive the foot. These reinforcing strips or plates serve a very useful purpose, as they admit of the said frame being struck up of sheet-stock and having a thin bottom portion integral with the sides and of the same thickness. To construct the frame in this manner is of commercial importance, as it greatly reduces the cost of manufacture and also reduces the weight of the frame, which is a desirable feature when applied to the horse's feet. When so constructed of this light material, the bottom portion of the frame needs reinforcing in order to present stock thick enough to receive the threaded portion of the spurs 21, and this threaded portion of the spur in turn serves to fasten the plates in position. These spurs are preferably made of steel and sharpened at their lower ends, and any desired number may be inserted into the bottom of the frame. I have also shown a layer of felt 22 around the bottom and sides of the frame, which may be used, if desired, as a protection to the hoof.

One great advantage of this creeper is that the same may be made to take the place of shoes during the icy weather in the winter-time. In other words, it is not necessary in order to attach my creeper to a horse's hoof that the horse should be shod, as the creeper may be used equally well either way and will thoroughly protect the hoof.

It is found in practice that the ease and rapidity with which this creeper may be connected and disconnected to and from the horse's foot, together with its efficiency and practical construction, renders the same highly desirable for the purpose specified.

Having thus described my invention, what

I claim as new, and desire to secure by Letters Patent, is—

1. A device of the character described comprising a two-part hinged frame adapted to be struck up from sheet-stock and shaped to substantially fit the animal's hoof and engage the bottom and sides thereof, a set of reinforcing-plates in the bottom of said frame, spurs threaded through the bottom of said frame into said plates, and means for locking the frame onto the hoof.

2. In a device of the character described, a frame shaped to substantially fit the animal's hoof and engage the sides thereof, said frame being adapted to be opened to admit the hoof, spurs extending from the bottom of said frame, and a hinged tongue adapted to draw the sides of said frame around the hoof and lock the same in position.

3. In a device of the character described, a hinged frame adapted to substantially fit the animal's hoof and engage the sides thereof, reinforcing-plates in the bottom of said frame, spurs threaded through the bottom of said frame into said plate, and a hinged tongue adapted to draw the rear ends of said frame together and lock the same to the hoof.

4. In a device of the character described, a separable frame adapted to engage the animal's hoof, reinforcing-plates in the bottom of said frame, spurs threaded through the bottom of said frame into said plate, a strap provided with an eye on the rear of said frame, and a spring-hinged tongue or clasp on said frame adapted to engage said strap to draw and lock said frame to the hoof.

5. In a device of the character described, a hinged frame adapted to substantially fit the animal's hoof and said frame being adapted to be opened to admit and engage the sides thereof, spurs extending from the bottom of said frame, a strap on the rear of said frame provided with an eye, and a spring-hinged tongue adapted to engage said strap to draw the sides of said frame together and securely lock the same to the hoof.

6. A creeper of the class described comprising a two-part hinged frame, both parts of said frame being adapted to be struck up from sheet-stock and formed to substantially fit the animal's hoof and engage the bottom and sides thereof, a set of reinforcing-plates in the bottom of said frame for stiffening the same, removable spurs threaded through the bottom of said frame into said plates, an adjustable strap on the rear of said frame and a spring-hinged tongue adapted to engage said strap to draw the sides of said frame together and securely lock the same to the hoof.

In testimony whereof I affix my signature in presence of two witnesses.

LOUIS A. GARDNER.

Witnesses:
  HOWARD E. BARLOW,
  E. I. OGDEN.